United States Patent [19]
Williams

[11] Patent Number: 6,038,512
[45] Date of Patent: Mar. 14, 2000

[54] METHOD AND SYSTEM FOR ESTIMATING EARTH ENVIRONMENTAL EFFECTS IN RELATION TO PLANETARY ORBITAL DYNAMICS

[76] Inventor: Joseph T. Williams, 45516 Lostwood Ave., Lancaster, Calif. 93534-1732

[21] Appl. No.: 09/231,290

[22] Filed: Jan. 15, 1999

[51] Int. Cl.$^7$ ........................................ G01V 1/00
[52] U.S. Cl. ..................... 702/3; 702/4; 702/5; 367/14
[58] Field of Search ................................ 367/14, 21, 40, 367/43; 702/3, 4, 5

[56] References Cited

U.S. PATENT DOCUMENTS 4,213,194   7/1980   Spurlock et al. ...................... 367/14

*Primary Examiner*—Christine Oda
*Assistant Examiner*—Anthony Jolly
*Attorney, Agent, or Firm*—Dennis W. Beech

[57] ABSTRACT

This method and system for estimating Earth environmental effects in relation to planetary orbital dynamics provides for integrating seemingly diverse data input sources gathered from historical data, field data, meteorological sensors, satellites, and the like for geophysical, meteorological, archeological and astrophysical purposes to perform comparison, correlation, time and date determinations for historical analysis and future event prediction. Computer systems which are used to collect and store necessary data are linked by the most appropriate transmission means given the location and data transmission characteristics to be networked. A data base module is used to store historical or archival data as well as large input current data. This is then combined and correlated with various integrators of selected data to be used in a computer operating system to organize the data for the user in simulations to provide for historical analysis and future environmental event projection in the geophysical and meteorological fields. Such refinements may improve weather prediction as well as provide early warning for more catastrophic events.

13 Claims, 4 Drawing Sheets

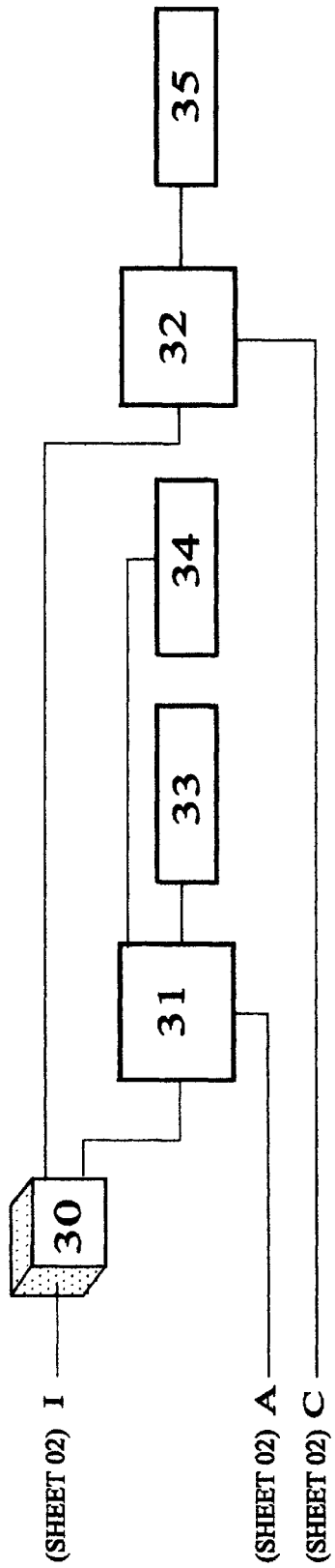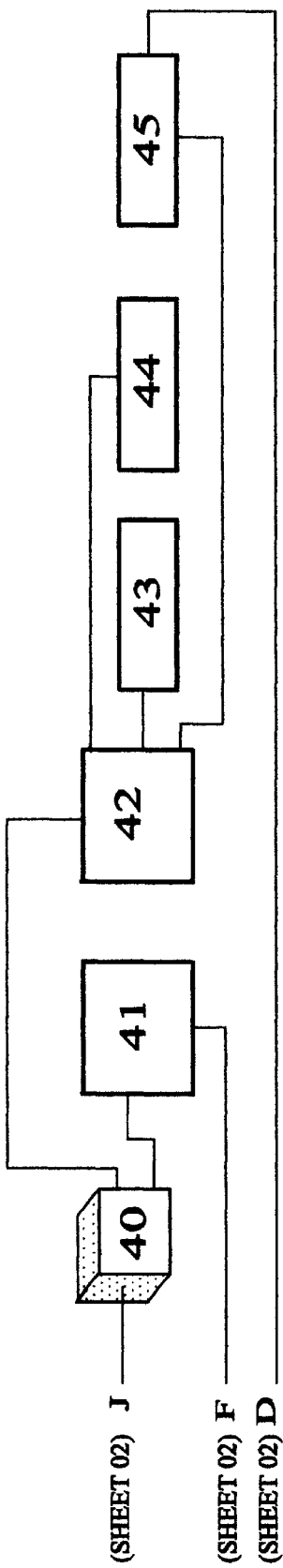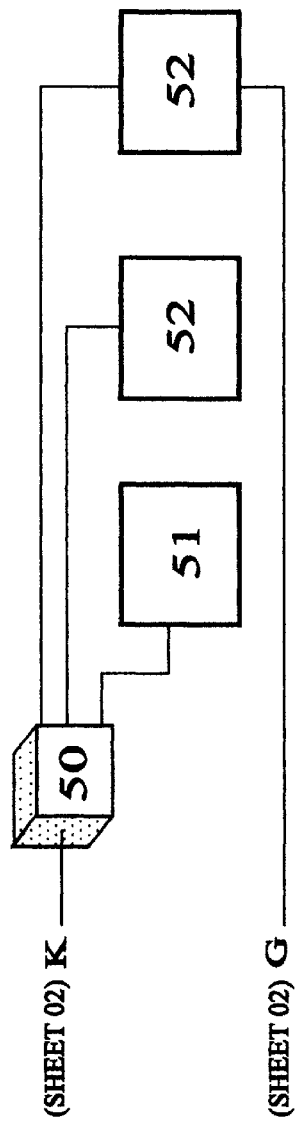

METHOD AND SYSTEM FOR ESTIMATING EARTH ENVIRONMENTAL EFFECTS IN RELATION TO PLANETARY ORBITAL DYNAMICS

BACKGROUND OF THE INVENTION

1. Field of the Invention

The subject of this invention is the correlation of information data sources for geographical, meteorological, archeological and astrophysical to evaluate their interrelationship relative to Earth environmental effects for use in predicting future geophysical and meteorological events. The new process links and integrates various elements of the data sources to then be processed by a computer system for simulation and modeling by a user to provide Earth environmental effects history and predictions.

2. Description of Related Art

Currently various agencies including the U.S. Government through NASA for example as well as other entities collect Earth related atmospheric information, surface and subsurface data, and planetary orbital movements. In addition archeological data and historical planetary event data is collected. In most cases the study and use of this data is contained within the particular scientific field or community to which it is directly related. A well known example is the use of meteorological data by weather forecasters on a continuing basis to track storms and predict weather patterns. However, as in this instance, the use of collateral data and information such as past geophysical events or orbital dynamics and patterns of planets to compare data for further insights has not been well researched or used by such forecasters.

The invention described herein provides a method and system for integrating these seemingly diverse data input sources gathered from field data, meteorological sensors, satellites, historical references, etc. for geophysical, meteorological, archeological and astrophysical purposes to perform comparison, correlation, time and date determinations for historical analysis and future event prediction. While current art makes predictions for weather, attempts to predict earthquake and volcano activity, etc., the instant invention combines and further refines data input to be used to simulate and project Earth environmental effects. Computer systems which are used to collect and store the necessary data are linked by the most appropriate transmission means given the location and data transmission characteristics to be networked. A data base module is used to store historical or archival data as well as large input current data collection. This is then combined and correlated with various integrators of selected data to be used in a computer operating system to organize the data for the user in simulations to provide for historical analysis and future environmental event projection in the geophysical and meteorological fields. Such refinements may improve weather prediction as well as provide early warning for more catastrophic events.

SUMMARY OF THE INVENTION

One object of the invention is to collect data from geophysical, meteorological, archeological and astrophysical sources to be date and time identified; to then integrate selected elements of this data; and to subsequently combine the data including the integrated data in a computer simulation to correlate event r elated data for historical study. A further object is to extrapolated the collected and integrated data using the computer simulation to project future Earth environmental effects and events .

In accordance with the description presented herein, other objectives of this invention will become apparent when the description and drawings are reviewed.

BRIEF DESCRIPTION OF THE DRAWING

FIG. 3 illustrates the astrophysics server system with observatory site and magnetometer sensor data input sources.

FIG. 4 illustrates the archeological server system with research data input sources and historical archive data access.

FIG. 5 illustrates the meteorological server system with data input sources.

DESCRIPTION OF THE PREFERRED EMBODIMENT

The present invention links data collected from various sources and sensors for geophysical, meteorological, archeological and astrophysical purposes including the date and time of occurrence of the data and integrates selected elements of such data to then be combined in a computer simulation and model. The computer simulation and model correlates event related data for historical study and for projections regarding future trends and events in Earth environmental effects.

Figure 1:
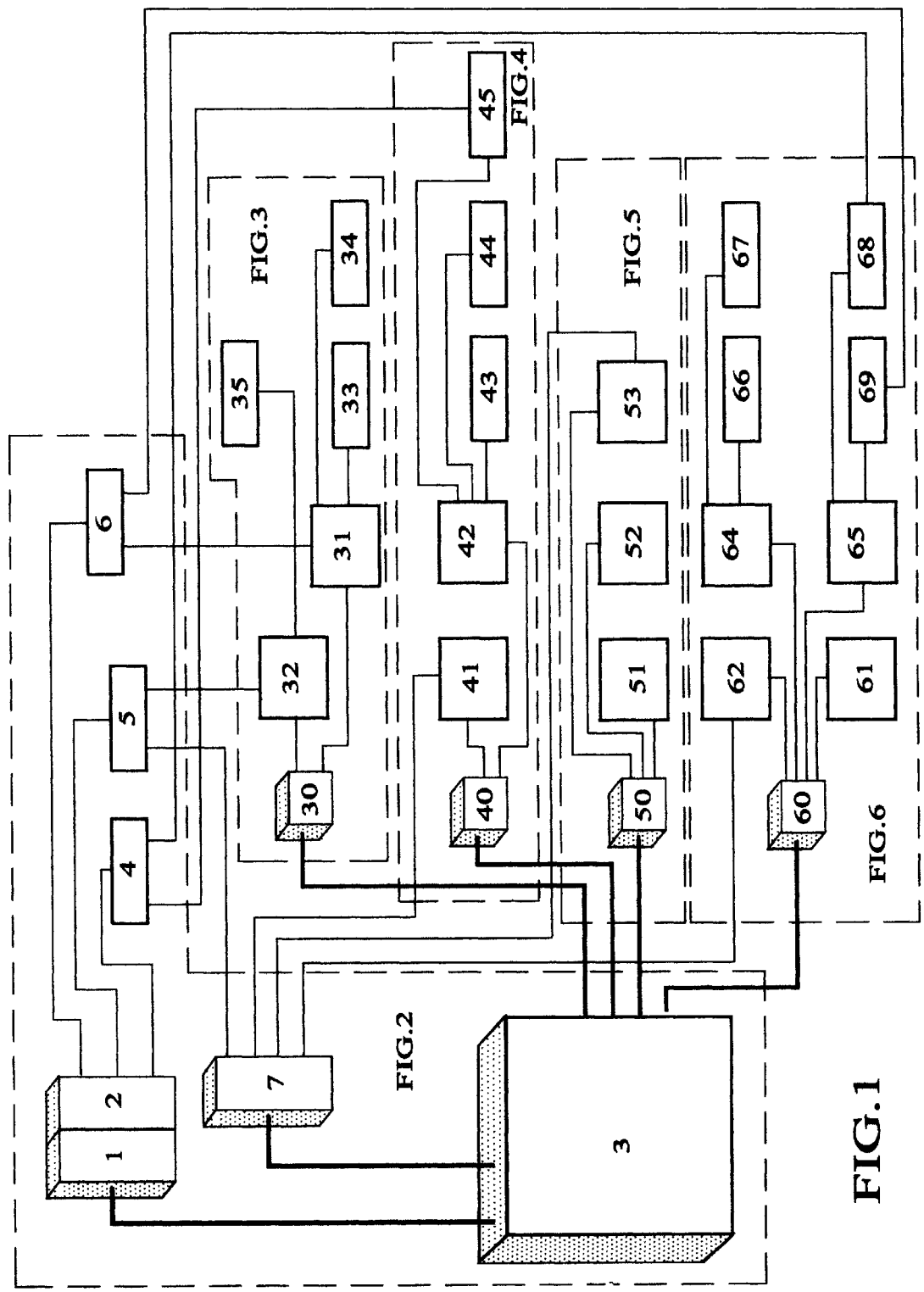
FIG. 1 illustrates a data flow diagram of the system.
Figure 2:
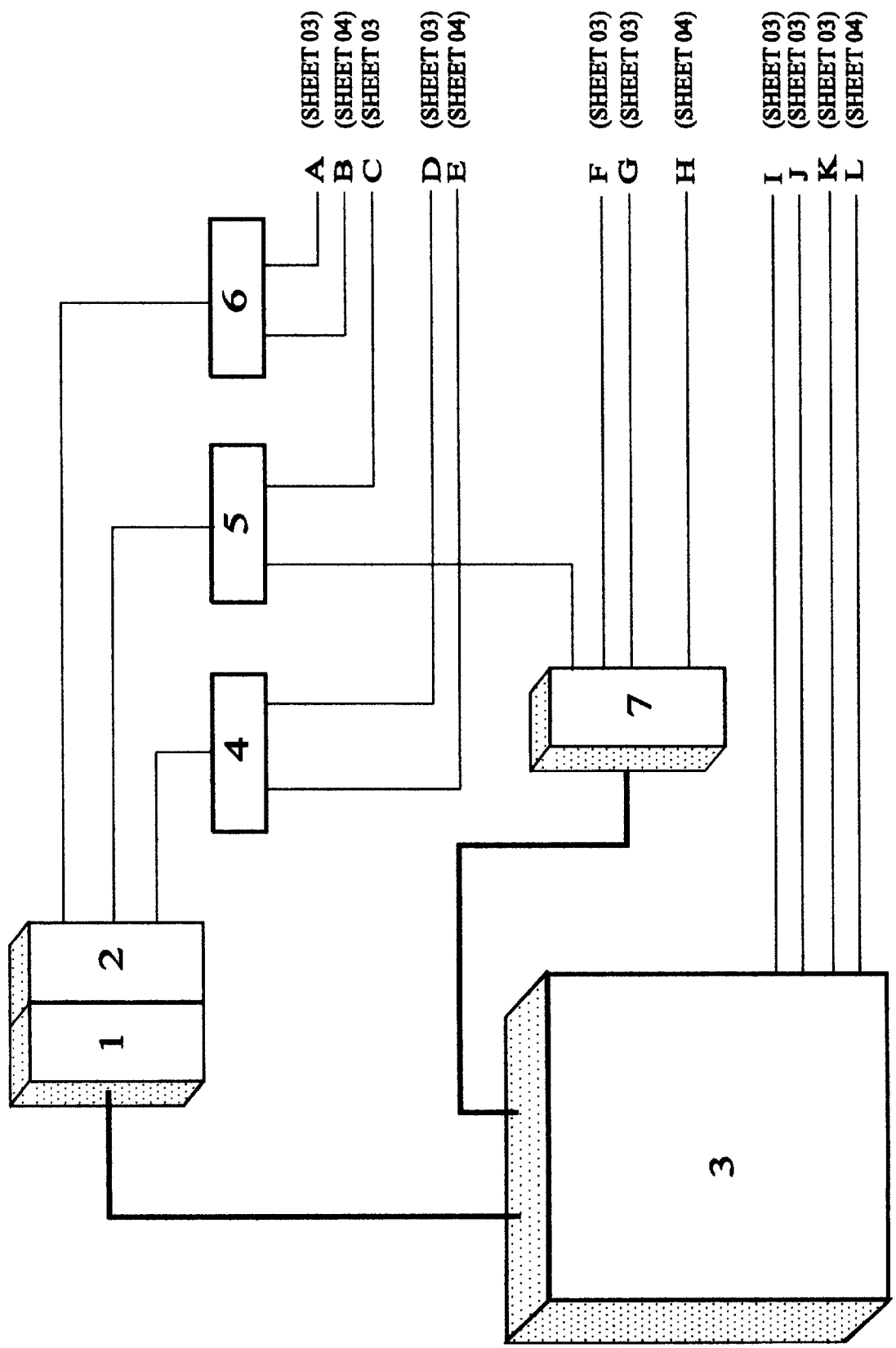
FIG. 2 illustrates the central data storage, simulation and output terminal elements as well as the historical data base server of the invention.

Referring to FIG. 1, a computer and output terminal module (1) having a simulation and modeling function (2) is linked to a database module and system server (3) and three integrators (4, 5, 6). The database module and system server (3) and integrators (4, 5, 6) are in turn linked to various information data sources, such as the historical data base server (7). It has been found that for current data sources, data processing and output requirements that the data base module and system server (3) requirements include 400 MHZ, 64 bit and 80 gigabyte processing and storage capacity. All data received and transferred in the system is identified with date and time of occurrence. Such data is formatted with an identifying date and time identification digital word or tag such as used in bar code systems.

Referring to FIG. 3, an astrophysics server system (30) is a data processing unit which receives information from data sources linked to the system which information is related to the astrophysical field of technology. It has been found that for current data sources, data processing and output requirements a server having a 300 MHZ, 32 bit and 20 gigabyte processing and storage capacity is necessary. The astrophysics server system (30) collects and stores sources data for output to the data base module and system server (3).

The astrophysics server system (30) receives input from a magnetometer amplitude analysis system (31) and an orrery conjunction analysis system (32) and/or ephemeris analysis system of long range ephemerides of the solar system planets. The magnetometer amplitude analysis system (31) registers gravitational influence readings which are received from a Moon and Sun data source (33) and Jupiter planet data source (34). The Moon and Sun data source (33) information results from magneto-amplitude test instrument measurements taken from NASA satellite data and from the surface of the earth using NASA data, ground source data from various entities and the like. The Jupiter planet data source (34) information is also magneto-amplitude test instrument measurements taken by use of NASA and other entities. While use of Jupiter data is described, because it is currently believed to effect the Sun and thereby indirectly effects the earth, other planets may be included. Solar activity is studied relative to environmental effects.

The orrery conjunction analysis system (32) includes an interactive, digital planetarium, orrery that is capable of simulating planetary conjunctions. Pattern simulation range from 30,000 B.C. to 30,000 A.D. is desirable. A telescopic observatory site (35) may be linked to the orrery conjunction analysis system (32) for purposes of checking the simulation as compared to planetary motion and as a back up to the simulation, as well as monitoring solar activity.

The astrophysics server system (30) utilizes the received source data to compare and calibrate the Moon and Sun data relative to Jupiter and other planet data. A user operating this server compares the time and date aligned data to correlate effects of the planets positions and potential correlated influences. This is then combined with the orrery conjunction analysis system (32) data in time and date correlation. The astrophysics server system (30) with user interaction serves as a filter to forward time and date correlated information to the data base module and system server (3). The selected date and time data results are transmitted to the data base module and system server (3) for subsequent retrieval and use in the simulation and modeling function (2).

Referring to FIG. 4, the archeological server system (40) is a data processing unit receiving information from data sources in the archeological field of technology. It has been found that for current data sources, data processing and output requirements a server having a 300 MHZ, 32 bit and 20 gigabyte processing and storage capacity is necessary. The archeological server system (40) separates current data from historical, prehistorical data and stores source data for output to the data base module and system server (3).

The archeological server system (40) receives input from an archeological historical data base (41) and from several data sources via an information link (42). The archeological historical data base (41) archives data, findings, from historical, prehistorical research and findings.

The information link (42) buffers information data sources for input to the archeological server system (40) with such sources identified in the fields of Archeology, Paleontology, Egyptology and Anthropology. More specific data sources include the underwater archeological research source (43) and undersurface archeological research source (44) which sources relate to underwater and underground cities and structures. These research sources are currently updated and maintained by various entities, such as, Universities in the United States, Europe and elsewhere of which Florida State is but one example, and other agencies, such as governments, museums and the like. Also radiocarbon 14 data source (45) currently updated and maintained similarly to (44) for radiocarbon 14 dating of tested materials is stored or buffered by the information link (42) for access by the archeological server system (40).

The archeological server system (40) utilizes the received source data to time and date align the data for comparison to correlate effects exhibited by the archeological data with various events as processed by the other server elements of the system. The archeological server system (40) with user interaction serves as a filter to forward time and date correlated information to the data base module and system server (3). The selected date and time data results are transmitted to the data base module and system server (3) for subsequent retrieval and use in the simulation and modeling function (2).

Referring to FIG. 5, the meteorological server system (50) is a data processing unit receiving information from data sources in the meteorological field of technology. It has been found that for current data sources, data processing and output requirements a server having a 300 MHZ, 32 bit and 20 gigabyte processing and storage capacity is necessary. The meteorological server system (50) separates historical data from current data and stores source data for output to the data base module and system server (3).

The meteorological server system (50) receives input from, for example, a satellite infrared jet stream tracing system (51) currently maintained by NASA and like meteorological data from other agencies. It also receives input from a current weather data system (52) based on a worldwide weather satellite network. This is generally characterized by the MODIS Airborne Simulator and sensor system of NASA's Earth Observation System which provides cloud and surface feature imagery. Also included is the GEOS, Geostationary Operational Environmental Satellite, sounding system and future GHIS systems which are managed by NASA and NOAA to provide moisture and temperature data relative to the earth. The NASA hurricane and cyclone field study data are also processed. Finally, data is also received from a meteorological historical data base (53) which system stores data collected from the meteorological data sources.

The meteorological server system (50) performs the operation of time and date alignment of the data to provide for comparison to correlate the effects of the various meteorological events relative to the other data processed by the system servers. The meteorological server system (50) with user interaction serves as a filter to forward time and date correlated information to the data base module and system server (3) for the source data. The selected date and time data results are transmitted to the data base module and system server (3) for subsequent retrieval and use in the simulation and modeling function (2).

Figure 6:
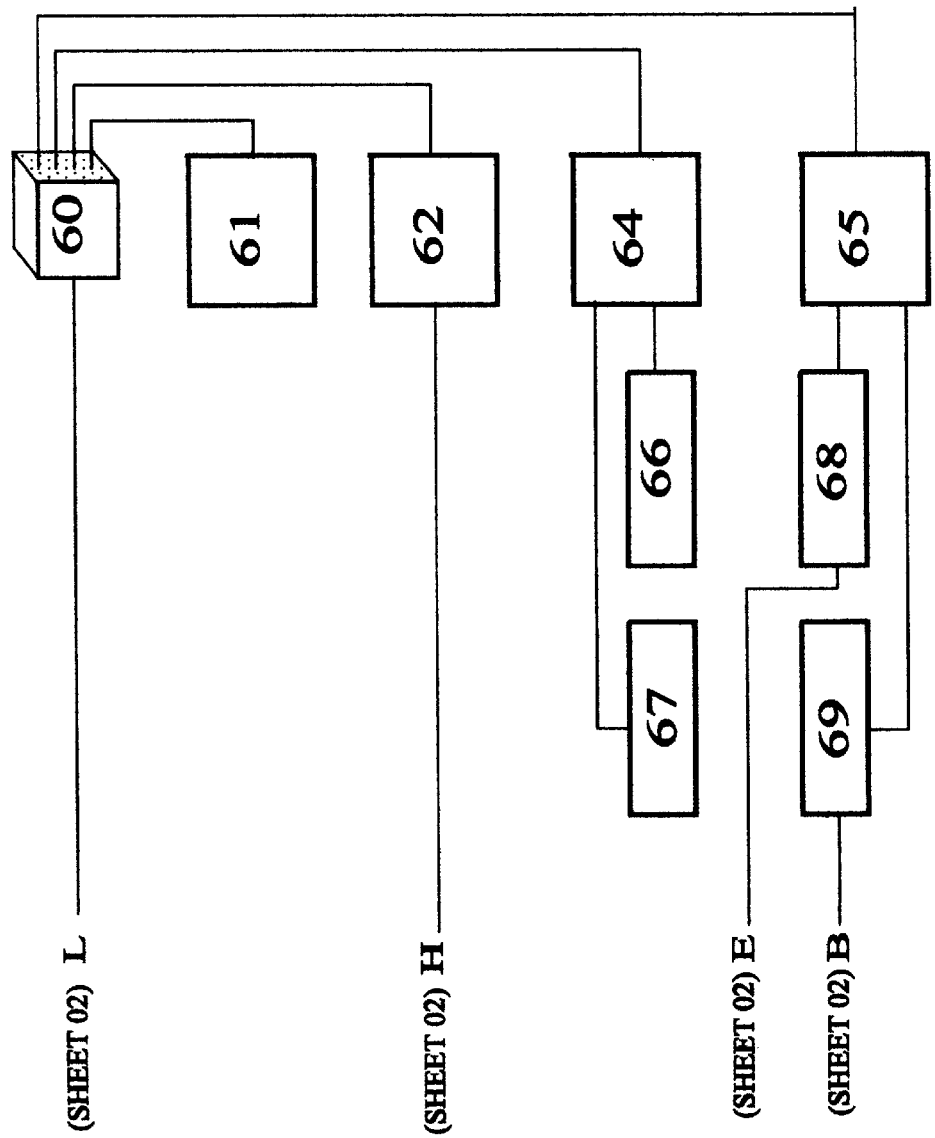
FIG. 6 illustrates the geophysical server system with geophysics, infrared sensor and oceanographic data input sources.

Referring to FIG. 6, the geophysical server system (60) is a data processing unit receiving information from data sources in the geophysical field of technology. It has been found that for current data sources, data processing and output requirements a server having a 300 MHZ, 32 bit and 20 gigabyte processing and storage capacity is necessary. The geophysical server system (60) separates historical, prehistorical data from current data and stores source data for output to the data base module and system server (3).

The geophysical server system (60) receives input from a plate tectonics data source (61) which registers current and historic tectonic plate, volcanic and earthquake activity and is currently maintained by the USGS. The geophysical server system (60) also receives input from a geophysics records data base (62) which separates historic, prehistoric data from current information.

Two additional sources of information in the geophysical field are the satellite infrared mapping data source (64) and the oceanographic system data source (65). In the case of the satellite infrared mapping data source (64), data from infrared and geosounder satellites currently maintained by NASA, USGS and NOAA which can detect undersurface structures as well as objects underwater, land and ice is analyzed using an undersurface structure analysis module

(66) and stream and river confluence analysis module (67). Other agencies also have access to and provide infrared and sounder data.

The oceanographic system data source (65) receives data from a synthetic aperture radar data source (68) or sources which is currently maintained by NASA and various other United States and foreign agencies. This data source (68) includes antarctic ice sheet data pertaining to geophysical, meteorological and archeological information. Geophysical and meteorological ice sheet seasonal growth patterns are registered from both a historical and current context. Geophysical radiocarbon 14 dating test on biological specimens are included. Data from a tidal data source (69) is also processed by the oceanographic system data source (65) for current tidal information pertaining to storm activity, orbital dynamics and plate tectonics. This ocean observation source includes open ocean surface waves, mesoscale currents, surface wind speed/stress, interval waves; coastal ocean and estuary underwater topography, upwelling and air-sea interaction, internal waves, soloy, coastal wave refraction, shoreline changes, coastal watch, surfactant monitoring, shipping and search and rescue, fisheries support; as well as atmospheric convection, rain rates, rain patterns; and ice motion and thicknesses to estimate fluxes, ice dynamics, iceberg motion and sea and lake coverage.

The geophysical server system (60) performs the operation of time and date tagging and alignment of the data to provide for comparison to correlate the effects of the various geophysical events relative to the other data processed by the system servers. The geophysical server system (60) with user interaction serves as a filter to forward time and date correlated source data information to the data base module and system server (3). The selected date and time data results are transmitted to the data base module and system server (3) for subsequent retrieval and use in the simulation and modeling function (2).

Referring again to FIG. 1, the three integrator modules (4,5,6) receive selected data from the previously described elements. The radiocarbon 14 dating integrator module (4) receives data from the radiocarbon 14 data source (45) and the synthetic aperture radar data source (68). The data is integrated by date and time comparison to match results pertaining to Paleocene information. The integration results are routed to the computer and output terminal (1) for comparison with other source data in the simulation and modeling function (2) which for the preferred embodiment is knowledgeable users to compare events and history that is date and time correlated.

The date, time stamp match integrator module (5) receives data from the orrery conjunction analysis system (32) and the historical data base server (7). The data is integrated by date and time comparison to match entries based on conjunctions from (32) and historical matches from (7) wherein all relevant date and time historical information for discovered conjunctions can be compared for orbital placement research. The integration results are routed to the computer and output terminal (1) for comparison with other source data in the simulation and modeling function (2).

The gravitational calibration integrator module (6) receives data from the magnetometer amplitude analysis system (31) and the tidal data source (69). The data is integrated by date and time comparison to analyze simulation studies of orbital dynamics influence on tidal activity, surges. The integration results are routed to the computer and output terminal (1) for comparison with other source data in the simulation and modeling function (2).

The historical data base server (7) functions as an intermediate storage buffer and filter for certain subsets of historical data received from the archeological historical data base (41), the meteorological historical data base (53) and the geophysical historical data base (62) and forwarding selected data to the date, time stamp match integrator module (5). The historical data base server (7) with user interaction serves as an intermediate storage and filter to forward time and data correlated historical information to the data base module and system server (3).

Figure 7:
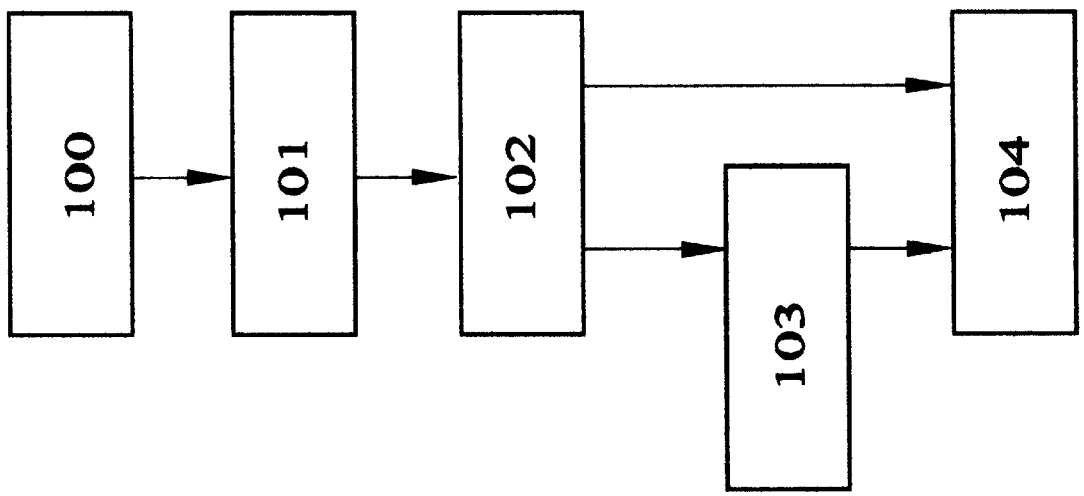
FIG. 7 illustrates a functional flow diagram of the system.

Referring to FIG. 7, a functional flow diagram is presented summarizing the operations performed by the invention. Data source information is collected (100) and checked for date and time identification (101). The data is processed (102) by the various system elements in the manner described herein and for particular source data the information is integrated (103). The results of the processing by the various system elements are then combined (104) in the simulation and modeling function (2) to correlate event related data for historical and projection of Earth environmental effects in relation to planetary orbital dynamics.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A process for estimating earth environmental effects in relation to planetary orbital dynamics, comprising the steps of:

receiving astrophysical data from a plurality of data sources which data has date and time identification, correlating like date and time data, and filtering the data to transmit selected data to a data base module and system server wherein such data sources include orrery conjunction data and historical data from a plurality of data sources and magnetometer amplitude data and tidal data from a plurality of data sources;

receiving archeological data from a plurality of data sources which data has date and time identification, correlating like date and time data, and filtering the data to transmit selected data to a data base module and system server;

receiving meteorological data from a plurality of data sources which data has date and time identification, correlating like date and time data, and filtering the data to transmit selected data to a data base module and system server wherein the meteorological data includes input from a current weather data system and a meteorological historical data base;

receiving geophysical data from a plurality of data sources which data has date and time identification, correlating like date and time data, and filtering the data to transmit selected data to a data base module and system server;

comparing the selected data transmitted to the data base module and system server to correlate like date and time data, and storing the correlation results; and transmitting the correlation results to a computer and output terminal module for evaluation by a simulation and modeling function to determine date and time event and effect data correlations.

2. The process as in claim 1 further including the steps of:
receiving historical data from a plurality of data sources which data has date and time identification, correlating like date and time data, and filtering the data to transmit selected data to a data base module and system server.

3. The process as in claim 1 further including the steps of:

receiving radiocarbon 14 dated data and synthetic aperture radar data from a plurality of data sources which data has date and time identification, integrating like date and time data, and filtering the data to transmit selected data to a data base module and system server.

4. The process as in claim 1 wherein the step of receiving astrophysical data including the steps of:

receiving input from a magnetometer amplitude analysis system and an orrery conjunction analysis system;
wherein the magnetometer amplitude analysis system registers gravitational influence readings received from a Moon and Sun data source and a planet data source; and
wherein the orrery conjunction analysis system is calibrated using a telescopic observatory site.

5. The process as in claim 4 further including the steps of:

comparing by a human user the input date and time aligned data to correlate effects of the planets positions and potential correlated influences; and transmitting the compared aligned data to the data base module and system server.

6. The process as in claim 1 wherein the step of receiving archeological data including the steps of:

receiving input from an archeological historical data base and from an information link; and wherein the information link buffers information received from an underwater archeological research source, an undersurface archeological research source and a radiocarbon 14 data source.

7. The process as in claim 6 further including the steps of:

comparing by a human user the input date and time aligned data to correlate effects exhibited by the archeological data; and transmitting the compared aligned data to the data base module and system server.

8. The process as in claim 1 wherein the step of receiving meteorological data including the step of:

receiving input from a satellite infrared jet stream tracing system.

9. The process as in claim 8 further including the steps of:

comparing by a human user the input date and time aligned data to correlate the effects of various meteorological events; and transmitting the compared aligned data to the data base module and system server.

10. The process as in claim 1 wherein the step of receiving geophysical data including the steps of:

receiving input from a plate tectonics data source, a geophysical records data base, a satellite infrared mapping data source, and an oceanographic system data source;

wherein the satellite infrared mapping data source processes data from infrared and geosounder satellites which has been analyzed using an undersurface structure analysis module and a stream and river confluence analysis module; and wherein the oceanographic system data source receives data from a synthetic aperture radar data source and a tidal data source.

11. The process as in claim 10 further including the steps of:

comparing by a human user the input date and time aligned data to correlate the effects of various geophysical events; and transmitting the compared aligned data to the data base module and system server.

12. The process as in claim 2 wherein the step of receiving historical data including the steps of:

receiving input from an archeological historical data base, a meteorological historical data base and a geophysical historical data base; and transmitting input date and time aligned data selected by a human user to a date, time stamp match integrator module and to the data base module and system server.

13. The process as in claim 1 wherein the step of determining date and time event and effect correlations is performed by a plurality of knowledgeable users to compare events and history that is date and time correlated.

* * * * *